March 18, 1947. A. C. HUGIN 2,417,686

DYNAMOELECTRIC MACHINE

Filed Jan. 23, 1945 2 Sheets-Sheet 1

Inventor:
Adolph C. Hugin,
by Harry E. Dunham
His Attorney.

March 18, 1947.  A. C. HUGIN  2,417,686
DYNAMOELECTRIC MACHINE
Filed Jan. 23, 1945  2 Sheets-Sheet 2
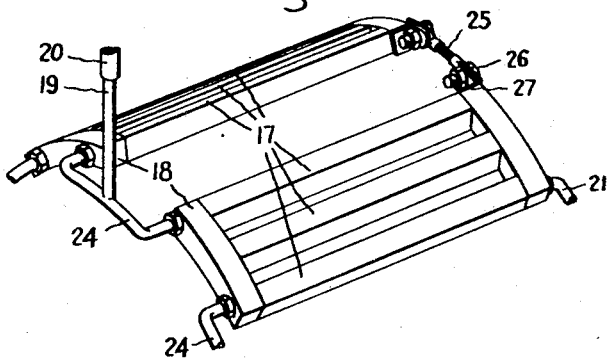
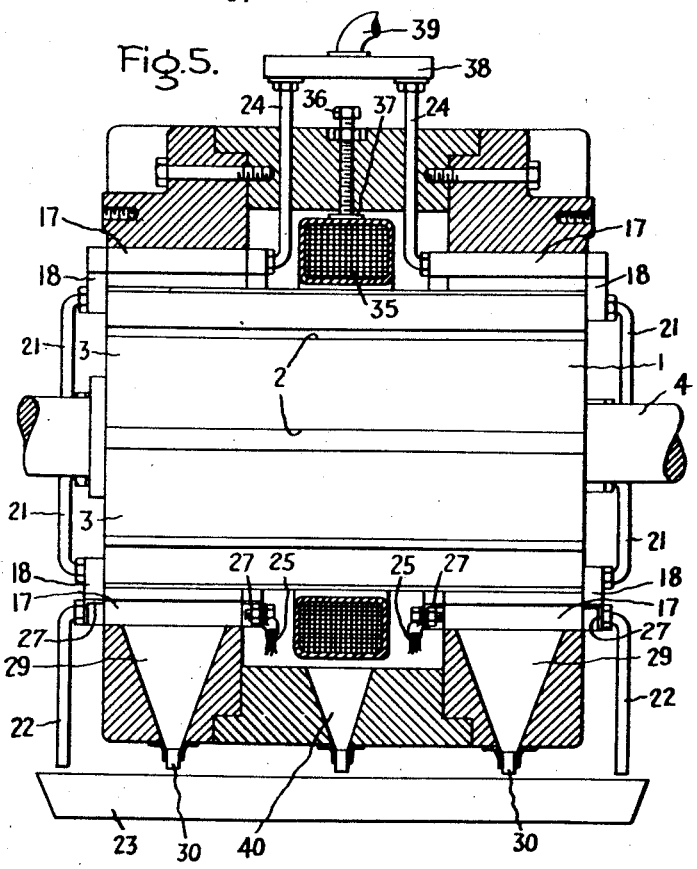
Inventor:
Adolph C. Hugin,
by Harry E. Dunham
His Attorney.

Patented Mar. 18, 1947

2,417,686

UNITED STATES PATENT OFFICE 2,417,686

DYNAMOELECTRIC MACHINE

Adolph C. Hugin, Schenectady, N. Y., assignor to General Electric Company, a corporation of New York Application January 23, 1945, Serial No. 574,053

19 Claims. (Cl. 188—104)

1

My invention relates to dynamoelectric machines and in particular to machines of the eddy current inductor type.

An object of my invention is to provide an improved dynamoelectric machine of the inductor type.

Another object of my invention is to provide an improved dynamoelectric machine with an arrangement for cooling the machine which includes supplying cooling fluid directly in contact with the induced current carrying members of the machine.

A further object of my invention is to provide an improved dynamoelectric machine of the inductor type provided with teeth in both relatively rotatable members of the machine with a squirrel cage winding in one member and circumferentially relatively wide eddy current pole face surfaces in the other member.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
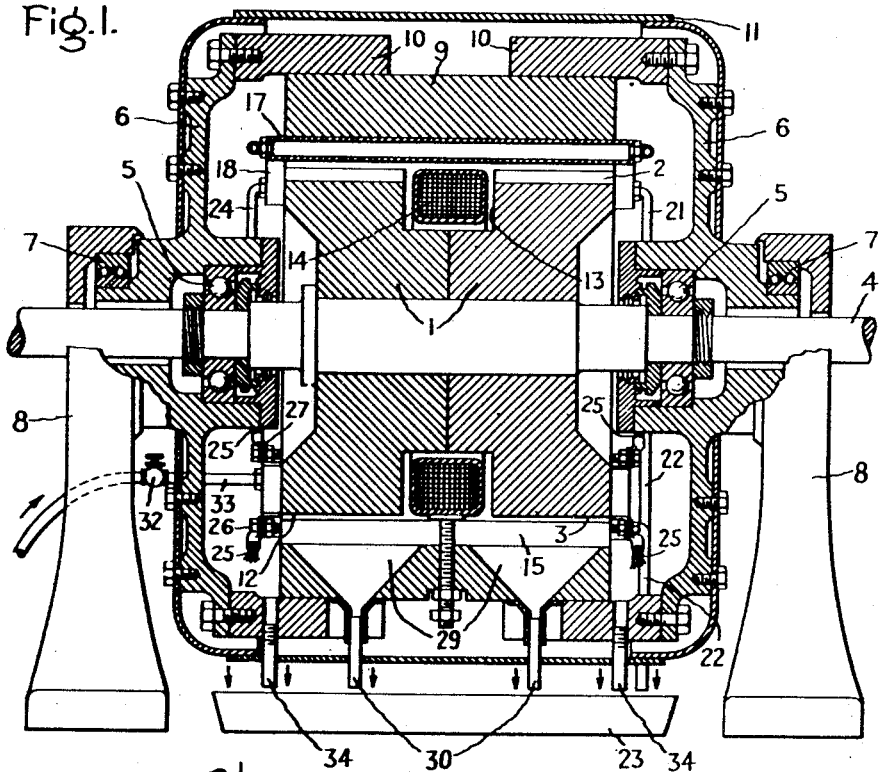
Figure 2:
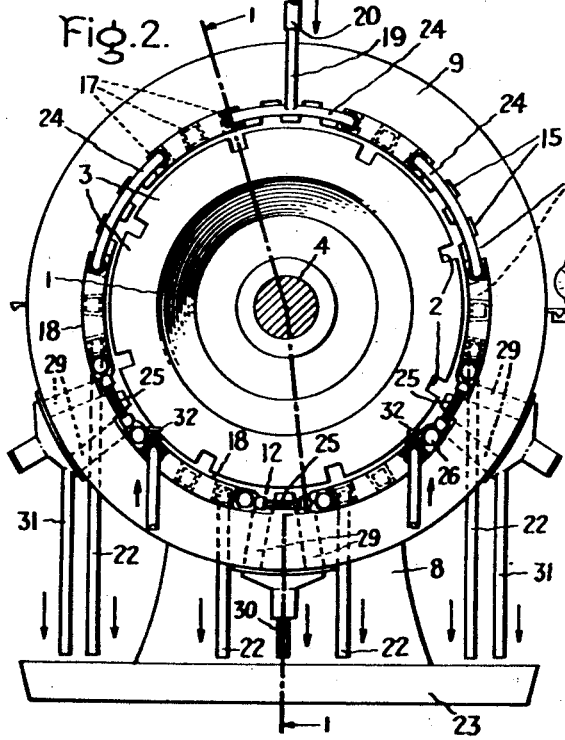
Figure 3:
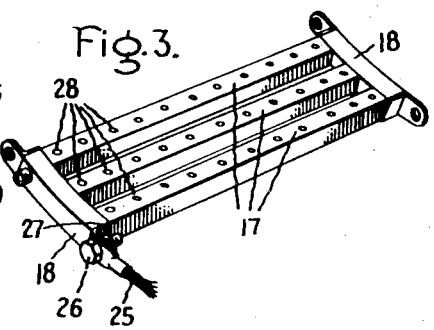

In the drawing, Fig. 1 is a side elevational view of a dynamometer, partly in section, showing an embodiment of my invention taken along line 1—1 of Fig. 2; Fig. 2 is an end view of the machine shown in Fig. 1 with the outer housing removed; Fig. 3 is a perspective view of one of the perforated sets of tubular inductor elements arranged in the slots of the outer member of the machine; Fig. 4 is a perspective view of the two upper sets of tubular elements arranged in the slots of the outer member of the machine; and Fig. 5 is a side elevational view, partly in section, of another embodiment of my invention.

Referring to the drawings, I have shown in Figs. 1, 2, 3, and 4 an embodiment of my invention in connection with a dynamoelectric machine of the inductor type which is adapted to be used as an absorption dynamometer. In this construction, the dynamoelectric machine is provided with a rotatable member 1 which may be formed of magnetic material having a relatively smooth outer surface formed with a plurality of longitudinally extending slots 2 providing teeth 3 between these slots having relatively wide circumferential faces. This member is mounted on a shaft 4 which is rotatably supported by bearings 5 in a bearing housing formed

2 in end shields 6 of another relatively rotatable member, and these end shields 6 are rotatably supported by antifriction roller bearings 7 in pedestals 8. The other relatively rotatable member in this construction is formed as a stationary member having limited rotational movement to provide for measuring the torque transmitted to the machine and is provided with a core member 9 of magnetic material mounted in supporting rings 10 and provided with an outer housing 11 secured to the end shields 6. Both of the relatively rotatable members 1 and 9 are substantially cylindrical and form the main magnetic circuit of the machine and are arranged as an outer relatively stationary member 9 and an inner relatively rotatable member 1 with an air gap 12 therebetween. The rotatable member 1 is formed with a coil recess 13 intermediate the ends thereof in which a field exciting winding 14 is arranged for magnetically exciting the machine. The outer core member 9 is formed with a plurality of longitudinally extending slots 15 which form a plurality of teeth 16 larger in number than the teeth 3 of the inner member, preferably not an even multiple of the teeth in the inner member in order to minimize any locking effect and pulsating torque when the machine is used as a dynamometer. If this type machine is used as an inductor clutch, the cooling arrangements could be simplified by omitting the rigid water connections and utilizing air or other suitable cooling media, and the squirrel cage winding can be made of conventional solid conductors with the teeth therebetween an even multiple of the teeth in the other member, if desired. This type machine combines the eddy current inductor features of an eddy current type machine together with the torque features obtainable by a short circuited winding in one of the members. This short circuited winding is formed by a plurality of tubular members 17 of relatively high electrical conductivity, such as copper, and is arranged in the slots 15 of the outer member. The tubular members 17 are formed in sets with the ends thereof electrically connected together in parallel by tubular headers 18, and the short circuited squirrel cage torque effects can be varied by varying the number of tubular members in any given machine; however, these tubular members should be arranged at least in certain of the slots of the stationary member to provide this squirrel cage effect. As shown more clearly in Fig. 2, the headers 18 on one side of the machine are connected to a supply conduit 19 connected by a suitable flexible hose 20 to a source of cooling fluid supply, such as water, while the headers 18 on the opposite side of the machine are connected together by suitable interconnecting drain pipes 21 to a drain outlet pipe 22 for exhausting the cooling fluid into a sump 23. In this construction, all of the tubular members 17 are not connected to the source of cooling fluid supply by the same conduit 19, nor are all the drain headers 18 on the other side of the machine connected to the same drain pipes 22. In Fig. 2, four sets of tubular members 17 are shown interconnected by supply tubes 24 and are interconnected on the other side of the machine by drain tubes 21. As shown in Fig. 4, the two upper sets of tubular members are not interconnected on the drainage side by a drain tube, but are electrically interconnected by a cable 25 of electrically conductive material, which is connected by suitable bolts 26 to terminal elements 27 mounted on the ends of the headers 18 in any suitable manner, as by brazing or soldering. The tubular members 17 and the headers 18 are formed of relatively high electrical conductivity material, such that rotation of the inner member 1 causes flux pulsations in these tubular members as the teeth 3 pass the slots 15 in which the tubular members 17 are arranged, and relatively high currents are induced in these tubular members. The flow of cooling fluid through these members provides for a very intimate contact of the cooling fluid with the elements in which the electric currents are induced and in which the heat is, therefore, generated. Furthermore, as these tubular elements heat up, a relatively good thermal contact will be provided between the sides of these elements and the sides of the teeth 16, such that the heat generated in the teeth due to eddy currents induced therein by flux variations due to the rotation of the teeth 3 of the rotatable member 1 will also be readily transferred to the tubular members 17 and into the cooling fluid which flows through these members, thus providing a very efficient arrangement for the removal of this generated heat from the machine. Rotation of the rotatable member 1 will also cause eddy currents to be induced in the air gap surface of the inner member 1, such that the faces of the teeth 3 will become heated. A certain amount of this heat will be transmitted to the outer member and from the outer member to the cooling fluid in the tubular members 17, but it may be found desirable to provide a further cooling system, as at high speeds, a large part of the power absorbed will be due to eddy currents induced in this inner member. The cooling of this member can be increased by providing a plurality of spray openings 28 formed in certain of the tubular elements in the lower portion of the machine for supplying cooling fluid directly into the air gap into contact with the adjacent surface of the inner member. The arrangement of these openings is more clearly shown in Fig. 3, and in this construction, only the two lower sets of tubular members are adapted to be provided with this type opening. In order to complete the squirrel cage winding, these lower sets of tubular members are formed with terminal elements 27, the same as those at the drain side of the two upper sets of tubular members, and these terminal elements 27 are interconnected by an electrical conductor 25 having a terminal at each end thereof suitably connected to the terminal elements 27 by bolts 26. The water is adapted to be drained from the air gap in the lower portion of the machine through suitable drain passages 29 formed in the outer core member 9 and provided with drain tubes 30 for exhausting the cooling fluid into the sump 23. The outer drain passages 29 are adapted to remove cooling fluid which may be carried upwardly into the air gap, and these are drained by suitable drain pipes 31 into the sump 23. In most instances, it is desirable that the flow of cooling fluid into the air gap be regulated to prevent total immersion of the rotatable member, and the slots 2 in the inner member core 1 effectively throw off water which collects on the surface of the teeth 3 and by centrifugal force tends to pump or eject the cooling fluid into the slots 15 which are formed with the drain passages 29, such that the tendency for the machine to be completely flooded is minimized. In some instances, it may be desirable also to supply water only to one of the perforated sets of tubular members 17 in the lower portion of the machine, and for this purpose, valves 32 are arranged between supply connections 33 to these tubular members, such that the flow of cooling fluid to these perforated tubular members can be throttled or can be completely shut off if desired. If only one of the perforated sets of tubular elements is utilized, it will be found desirable to use the set which is on the side of the lowest point of drainage to which rotation of the inner member will tend to carry the cooling fluid. Cooling fluid which may flow into the space between the stator rings 10 and the end shields 6 is adapted to be drained out through drain pipes 34 into the sump 23. Thus, the cooling fluid will have an opportunity to be drained from the air gap both by the lower drains 29 and by the drains on the upper side of the unused perforated tubular elements 17, thereby further assuring against flooding of the entire machine. In this manner, both the inner and outer members of the machine are utilized for varying the magnetic linkages with the other member of the machine and induce electric currents therein, and both members in which the electric currents are induced are adapted to be cooled by direct contact with the cooling fluid, thereby providing for a very efficient utilization of the cooling fluid and of the material in which the currents are induced. Furthermore, the number of tubular members 17 in each set, as well as the number of sets, can be varied to provide the desired squirrel cage effect, and the unit construction of these sets facilitates assembly and replacement of these units by simply disconnecting the electrical connections and the cooling fluid connections thereto and radially removing any set of tubular members from the slots as may be desired.

In Fig. 5, I have shown another embodiment of my invention in which the perforated tubular elements may be omitted from the machine if desired, and all of the elements are formed in the same manner and are all interconnected by supply connecting tubes 24 at one end of the machine and at the other end of the machine by drainage connecting tubes 21 with the upper and lower headers 18 on the drainage side of the machine electrically interconnected in the same manner as shown in Fig. 4. In this illustration, the same reference numbers are applied to parts which are similar to parts in Figs. 1 to 4 and the inner and outer members are adapted to be supported in any suitable manner, as shown in Fig. 1. In this construction, the stationary member is formed with a coil recess in which a field exciting winding 35 is arranged for magnetically exciting the machine. This field exciting winding is supported in any suitable manner, as by a plurality of setscrews 36 and clamping supports 37, so as to be substantially coaxial with the inner member 1. Two squirrel cage windings are formed in the outer stationary member by sets of tubular members 17 arranged in the slots 15 on both sides of the field exciting winding 35. Both of the squirrel cage windings are supplied with a cooling fluid from a suitable header 38 which is connected in any suitable manner, as by a flexible hose 39 to a source of cooling fluid supply, such as water, and an additional drain 40 is provided in the lower portion of the coil recess 34 in order to drain cooling fluid from around the field exciting winding 35 if perforated tubular elements 17 are used.

In both of these constructions, the field exciting winding is arranged in a waterproof container to prevent short-circuiting or damaging the winding by the cooling fluid which may come in contact therewith. Also, in both constructions, the cooling fluid drains through the outer member are preferably formed at the normally lowest point of the outer member to provide for a natural drainage of this cooling fluid from the machine, and also provide for contact of the cooling fluid with only a fractional circumferential part of the inner member for any given position thereof with the cooling fluid in the air gap. As the cooling fluid is exhausted substantially radially from the machine through the drains 29 and 40 and is collected in the sump 23, it may be cooled and recirculated through the machine, if desired, or if this is not economical, may be disposed of in any other suitable manner. Furthermore, if the capacity of the machine does not require the electrical connections formed by the connecting cables 25 between the headers 18 which are not interconnected by either supply or drainage tubes, these electrical connections may be omitted and the machine further simplified in this manner.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine having a pair of relatively rotatable members of magnetic material with an air gap therebetween, means for magnetically exciting said relatively rotatable members, a plurality of slots in the air gap surface of one of said members, a plurality of slots in the air gap surface of the other of said members greater in number than the slots in said one member and not an even multiple thereof, and cooling means including a squirrel cage winding formed of tubular electrical conductors in said slots in said other member arranged for the circulation of cooling medium therethrough.

2. A dynamoelectric machine having a pair of relatively rotatable members of magnetic material with an air gap therebetween, means for magnetically exciting said relatively rotatable members, a plurality of slots in the air gap surface of one of said members forming circumferentially relatively wide eddy current pole face surfaces therebetween, a plurality of slots in the air gap surface of the other of said members greater in number than the slots in said one member forming relatively narrow teeth therebetween, and cooling means including a squirrel cage winding formed of tubular electrical conductors in at least certain of said slots in said other member arranged for the circulation of cooling medium therethrough.

3. A dynamoelectric machine having a pair of relatively rotatable members of magnetic material with an air gap therebetween, means for magnetically exciting said relatively rotatable members, a plurality of slots in the air gap surface of one of said members, means including a plurality of tubular elements of electrically conductive material arranged in sets in at least certain of said slots and electrically connected together in parallel at each end thereof for forming a squirrel cage winding, means for supplying cooling fluid to said tubular elements, means for draining cooling fluid from said tubular elements, and slots in the air gap surface of the other of said members.

4. A dynamoelectric machine having a pair of relatively rotatable members of magnetic material with an air gap therebetween, means for magnetically exciting said relatively rotatable members, a plurality of slots in the air gap surface of one of said members, a plurality of slots in the air gap surface of the other of said members greater in number than the slots in said one member and not an even multiple thereof, means including a plurality of tubular elements of electrically conductive material in at least certain of said slots in said other member and connected together at each end thereof for forming a squirrel cage winding, means for supplying cooling fluid to said tubular elements, and means for draining cooling fluid from said tubular elements.

5. A dynamoelectric machine having a pair of relatively rotatable members of magnetic material with an air gap therebetween, means for magnetically exciting said relatively rotatable members, a plurality of slots in the air gap surface of one of said members, means including a plurality of tubular elements of electrically conductive material arranged in a plurality of sets in at least certain of said slots and connected together at each end thereof for forming a squirrel cage winding, means for supplying cooling fluid to said tubular elements, means for draining cooling fluid from said tubular elements, means for supplying cooling fluid into the air gap, slots in the air gap surface of the other of said members, and means for exhausting cooling fluid from the air gap.

6. A dynamoelectric machine having a pair of relatively rotatable members of magnetic material arranged as an inner member and an outer member with an air gap therebetween, means for magnetically exciting said inner and outer members, a plurality of longitudinally extending slots in the air gap surface of said outer member, means including a plurality of tubular elements of electrically conductive material arranged in a plurality of replaceable sets in at least certain of said slots and connected together at each end thereof for forming a squirrel cage winding in said outer member, means for supplying cooling fluid into the air gap, and means for exhausting cooling fluid from the air gap.

7. A dynamoelectric machine having a pair of relatively rotatable members of magnetic material arranged as an inner member and an outer member with an air gap therebetween, means for magnetically exciting said inner and outer members, a plurality of longitudinally extending slots in the air gap surface of said outer member, means including a plurality of tubular elements of electrically conductive material arranged in units each having a plurality of tubular elements in at least certain of said slots and connected together at each end thereof for forming a squirrel cage winding in said outer member, means for supplying cooling fluid to said tubular elements, means for draining cooling fluid from said tubular elements, means for supplying cooling fluid into the air gap, longitudinally extending slots in the air gap surface of said inner member, and means for exhausting cooling fluid from the air gap.

8. A dynamoelectric machine having a pair of relatively rotatable members of magnetic material arranged as an inner member and an outer member with an air gap therebetween, means for magnetically exciting said relatively rotatable members, a plurality of longitudinally extending slots in the air gap surface of said outer member, means including a plurality of tubular elements of electrically conductive material formed in similar replaceable unit sets and arranged in said slots and connected together at each end thereof for forming a squirrel cage winding in said outer member, means for supplying cooling fluid to said tubular elements, means for draining cooling fluid from said tubular elements, means for supplying cooling fluid into the air gap, and means for exhausting cooling fluid from the air gap.

9. A dynamoelectric machine having a pair of relatively rotatable members of magnetic material with an air gap therebetween, means for magnetically exciting said relatively rotatable members, a plurality of slots in the air gap surface of one of said members forming circumferentially relatively wide eddy current pole face surfaces therebetween, a plurality of slots in the air gap surface of the other of said members greater in number than the slots in said one member forming relatively narrow teeth therebetween, means including a plurality of tubular elements of electrically conductive material formed as replaceable units in at least certain of said slots in said other member and electrically connected together in parallel at each end thereof for forming a squirrel cage winding, means for supplying cooling fluid to said tubular elements, and means for draining cooling fluid from said tubular elements.

10. A dynamoelectric machine having a pair of relatively rotatable members of magnetic material arranged as an inner member and an outer member with an air gap therebetween, means for magnetically exciting said inner and outer members, a plurality of longitudinally extending slots in the air gap surface of said outer member, means including a plurality of tubular elements of electrically conductive material formed in replaceable sets in at least certain of said slots and electrically connected together in parallel at each end thereof for forming a squirrel cage winding in said outer member, means for supplying cooling fluid to said tubular elements, means for draining cooling fluid from said tubular elements, and means including longitudinally extending slots in the air gap surface of said inner member fewer in number than the slots in said outer member for varying the magnetic linkages with a given part of said outer member for inducing electric currents therein.

11. A dynamoelectric machine having a pair of relatively rotatable members of magnetic material with an air gap therebetween, means for magnetically exciting said relatively rotatable members, a plurality of slots in the air gap surface of one of said members, means including a plurality of tubular elements of electrically conductive material formed as removable sets arranged in at least certain of said slots and electrically connected together in parallel at each end thereof for forming a squirrel cage winding, means for supplying cooling fluid to said tubular elements, means for draining cooling fluid from said tubular elements, and means including longitudinally extending slots in the air gap surface of the other of said relatively rotatable members for varying the magnetic linkages with a given part of said first-mentioned rotatable member for inducing electric currents therein.

12. A dynamoelectric machine having a pair of relatively rotatable members of magnetic material arranged as an inner member and an outer member with an air gap therebetween, means including a field exciting winding intermediate the ends of said outer member for magnetically exciting said inner and outer members, a plurality of longitudinally extending slots in the air gap surface of said outer member, means including a plurality of tubular elements of electrically conductive material formed as removable units in at least certain of said slots on both sides of said exciting winding and electrically connected together in parallel at each of the ends thereof for forming a pair of squirrel cage windings in said outer member, means for supplying cooling fluid to said tubular elements, means for draining cooling fluid from said tubular elements, and means including longitudinally extending slots in the air gap surface of said inner member fewer in number than the slots in said outer member for varying the magnetic linkages with a given part of said outer member for inducing electric currents therein.

13. A dynamoelectric machine having a pair of relatively rotatable members of magnetic material arranged as an inner member and an outer member with an air gap therebetween, means including a field exciting winding in a winding space intermediate the ends of said outer member for magnetically exciting said inner and outer members, a plurality of longitudinally extending slots in the air gap surface of said outer member, means including a plurality of tubular elements of electrically conductive material formed in removable unit sets and arranged in said slots on both sides of said exciting winding and electrically connected together in parallel at each of the ends thereof for forming a pair of squirrel cage windings in said outer member, means for supplying cooling fluid to said tubular elements, means for draining cooling fluid from said tubular elements, and means including longitudinally extending slots in the air gap surface of said inner member for varying the magnetic linkages with a given part of said outer member for inducing electric currents therein.

14. A dynamoelectric machine having a pair of relatively rotatable substantially cylindrical members of magnetic material arranged as an inner member and an outer member with an air gap therebetween, means including a field exciting winding for magnetically exciting said inner and outer members, a plurality of longitudinally extending slots in the air gap surface of said outer member, means including a plurality of tubular elements of electrically conductive material formed in sets in at least certain of said slots and connected together at each end thereof for forming a squirrel cage winding in said outer member, means for supplying cooling fluid to said tubular elements, means for draining cooling fluid from said tubular elements, means for supplying cooling fluid through openings in said tubular elements into the air gap into contact with the adjacent surface of said inner member, means including longitudinally extending slots in the air gap surface of said inner member for centrifugally forcing cooling fluid outwardly from the surface thereof towards said outer member and for varying the magnetic linkages with a given part of said outer member for inducing electric currents therein, and means for exhausting cooling fluid from the air gap.

15. A dynamoelectric machine having a pair of relatively rotatable members of magnetic material arranged as an inner member and an outer member with an air gap therebetween, means for magnetically exciting said inner and outer members, a plurality of longitudinally extending slots in the air gap surface of said outer member, means including a plurality of tubular elements of electrically conductive material in at least certain of said slots and connected together at each end thereof for forming a squirrel cage winding in said outer member, means for supplying cooling fluid to said tubular elements, means for draining cooling fluid from said tubular elements, means including a plurality of supply openings in at least one of said tubular elements for supplying cooling fluid into the air gap into contact with the adjacent surface of said inner member, means including longitudinally extending slots in the air gap surface of said inner member fewer in number than the slots in said outer member for centrifugally forcing cooling fluid outwardly from the surface thereof towards said outer member and for varying the magnetic linkages with a given part of said outer member for inducing electric currents therein, and means for substantially radially exhausting cooling fluid from the air gap through at least one of said slots in said outer member.

16. A dynamoelectric machine having a pair of relatively rotatable substantially cylindrical members of magnetic material arranged as an inner member and an outer member with an air gap therebetween, means including a field exciting winding for magnetically exciting said inner and outer members, a plurality of longitudinally extending slots in the air gap surface of said outer member, means including a plurality of tubular elements of electrically conductive material formed in sets in at least certain of said slots and connected together at each end thereof for forming a squirrel cage winding in said outer member, means for supplying cooling fluid to said tubular elements, means for draining cooling fluid from said tubular elements, means including a plurality of supply openings in at least one of said tubular elements for supplying cooling fluid into the air gap into contact with the adjacent surface of said inner member, means including longitudinally extending slots in the air gap surface of said inner member for centrifugally forcing cooling fluid outwardly from the surface thereof towards said outer member and for varying the magnetic linkages with a given part of said outer member for inducing electric currents therein, and means for substantially radially exhausting cooling fluid from the air gap through at least one of said slots in said outer member.

17. A dynamoelectric machine having a pair of relatively rotatable members of magnetic material arranged as an inner member and an outer member with an air gap therebetween, means for magnetically exciting said inner and outer members, a plurality of longitudinally extending slots in the air gap surface of said outer member, means including a plurality of tubular elements of electrically conductive material formed in sets and arranged in at least certain of said slots and connected together at each end thereof for forming a squirrel cage winding in said outer member, means for supplying cooling fluid to said tubular elements, means for draining cooling fluid from said tubular elements, means including a plurality of supply openings in a set of said tubular elements in the lower portion of said machine on each side of the normally lowest point thereof for supplying cooling fluid into the air gap into contact with the adjacent surface of said inner member, means for controlling the flow of cooling fluid in said lower sets of tubular elements independently of each other, means including longitudinally extending slots in the air gap surface of said inner member for centrifugally forcing cooling fluid outwardly from the surface thereof towards said outer member and for varying the magnetic linkages with a given part of said outer member for inducing electric currents therein, and means for exhausting cooling fluid from the air gap.

18. A dynamoelectric machine having a pair of relatively rotatable substantially cylindrical members of magnetic material arranged as an inner member and an outer member with an air gap therebetween, means including a field exciting winding intermediate the ends of said outer member for magnetically exciting said inner and outer members, a plurality of longitudinally extending slots in the air gap surface of said outer member, means including a plurality of tubular elements of electrically conductive material formed in sets and arranged in at least certain of said slots on both sides of said exciting winding and connected together at each of the ends thereof for forming a pair of squirrel cage windings in said outer member, means for supplying cooling fluid to said tubular elements, means for draining cooling fluid from said tubular elements, means including a plurality of supply openings in certain of said tubular elements for supplying cooling fluid into the air gap into contact with the adjacent surface of said inner member, means including longitudinally extending slots in the air gap surface of said inner member for centrifugally forcing cooling fluid outwardly from the surface thereof towards said outer member and for varying the magnetic linkages with a given part of said outer member for inducing electric currents therein, and means for substantially radially exhausting cooling fluid from the air gap through at least one of said slots in said outer member.

19. A dynamoelectric machine having a pair of relatively rotatable substantially cylindrical members of magnetic material arranged as an inner member and an outer member with an air gap therebetween, means including a field exciting winding for magnetically exciting said inner and outer members, a plurality of longitudinally extending slots in the air gap surface of said outer member, means including a plurality of tubular elements of electrically conductive material formed in sets in certain of said slots and connected together at each end thereof for forming a squirrel cage winding in said outer member, means for supplying cooling fluid at one end of said member to said tubular elements, means for draining cooling fluid at the other end of said member from said tubular elements, means including a plurality of supply openings in certain of said tubular elements in the lower portion of said machine for supplying cooling fluid into the air gap into contact with the adjacent surface of said inner member, means including longitudinally extending slots in the air gap surface of said inner member fewer in number than the slots in said outer member for centrifugally forcing cooling fluid outwardly from the surface thereof towards said outer member and for varying the magnetic linkages with a given part of said outer member for inducing electric currents therein, and means for exhausting cooling fluid from the air gap through at least one of said slots in said outer member providing for contact of the cooling fluid with only a fractional circumferential part of said inner member for any given position thereof.

ADOLPH C. HUGIN.

REFERENCES CITED

The following references are of record in the file of this patent:

UNITED STATES PATENTS

| Number | Name | Date |
| --- | --- | --- |
| 2,188,398 | Bernard | Jan. 30, 1940 |
| 473,042 | Williams | Apr. 19, 1892 |
| 1,607,288 | Laffoon | Nov. 16, 1926 |
| 1,691,696 | Baum | Nov. 13, 1928 |
| 2,071,943 | Fraser | Feb. 23, 1937 |